United States Patent
Dhalwani et al.

(10) Patent No.: US 11,789,179 B2
(45) Date of Patent: *Oct. 17, 2023

(54) GENERATING WEATHER DATA BASED ON MESSAGING SYSTEM ACTIVITY

(71) Applicant: Snap Inc., Santa Monica, CA (US)

(72) Inventors: Anup Prabhakar Dhalwani, Bronx, NY (US); Walton Lin, Chatham, NJ (US); Andrew Lin, Long Island City, NY (US); Amer Shahnawaz, Venice, CA (US); Leonid Gorkin, Chappaqua, NY (US); Amber Taylor, Seattle, WA (US); Lillian Zheng, Los Angeles, CA (US); Eric Wood, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,712

(22) Filed: Nov. 1, 2022

(65) Prior Publication Data
US 2023/0052351 A1 Feb. 16, 2023

Related U.S. Application Data

(63) Continuation of application No. 16/928,959, filed on Jul. 14, 2020, now Pat. No. 11,574,225, which is a
(Continued)

(51) Int. Cl.
*G06V 20/00* (2022.01)
*G06F 18/214* (2023.01)
(Continued)

(52) U.S. Cl.
CPC ............ *G01W 1/02* (2013.01); *G06F 18/2148* (2023.01); *G06N 7/01* (2023.01); *G06N 20/00* (2019.01);
(Continued)

(58) Field of Classification Search
CPC ........ G06V 10/40; G06V 20/36; G06V 20/38; G06F 18/2147
See application file for complete search history.

(56) References Cited

U.S. PATENT DOCUMENTS 10,497,129 B1 * 12/2019 Cui .................. G06V 20/13
10,769,542 B1 * 9/2020 Dhalwani ............ G01W 1/02
(Continued)

OTHER PUBLICATIONS

"U.S. Appl. No. 15/989,967, Notice of Allowance dated May 13, 2020", 9 pgs.
(Continued)

*Primary Examiner* — Kevin Ky
(74) *Attorney, Agent, or Firm* — Schwegman Lundberg & Woessner, P.A.

(57) ABSTRACT

Systems and methods are provided for analyzing messages generated by a plurality of computing devices associated with a plurality of users in a messaging system to generate training data to train a machine learning model to determine a probability that a media content item was generated inside an enclosed location or outside, receiving a media content item from a computing device, analyzing the media content item using the trained machine learning model to determine a probability that the media content item was generated inside an enclosed location or outside, determining, based on the probability generated by the trained machine learning model, that the media content item was generated inside an enclosed location, and determining an inside temperature associated with the venue based on messages generated by a plurality of computing devices in a messaging system comprising media content items and temperature information for the venue or a similar venue type.

20 Claims, 8 Drawing Sheets

Related U.S. Application Data continuation of application No. 15/989,967, filed on May 25, 2018, now Pat. No. 10,769,542.

(51) Int. Cl.
  *G06V 10/774* (2022.01)
  *G06V 10/40* (2022.01)
  *G01W 1/02* (2006.01)
  *G06N 20/00* (2019.01)
  *G06N 7/01* (2023.01)

(52) U.S. Cl.
  CPC .......... *G06V 10/40* (2022.01); *G06V 10/7747* (2022.01); *G06V 20/35* (2022.01); *G06V 20/36* (2022.01); *G06V 20/38* (2022.01)

(56) References Cited

U.S. PATENT DOCUMENTS

| | | | | |
|---|---|---|---|---|
| 10,794,604 | B2* | 10/2020 | Endel | G05B 19/042 |
| 11,574,225 | B2* | 2/2023 | Dhalwani | G06V 20/38 |
| 2006/0153469 | A1* | 7/2006 | Gallagher | G06F 16/58 |
| | | | | 382/254 |
| 2009/0316671 | A1* | 12/2009 | Rolf | H04W 4/029 |
| | | | | 370/338 |
| 2015/0170389 | A1* | 6/2015 | Ming | G06T 5/009 |
| | | | | 382/284 |
| 2016/0102879 | A1* | 4/2016 | Guest | F24F 11/62 |
| | | | | 700/276 |
| 2017/0078546 | A1* | 3/2017 | Bezot | G06T 7/20 |
| 2017/0108838 | A1* | 4/2017 | Todeschini | G05B 15/02 |
| 2018/0146217 | A1* | 5/2018 | Kedenburg, III | H04N 21/422 |
| 2018/0202686 | A1* | 7/2018 | Ahuja | F24F 11/62 |
| 2018/0239948 | A1* | 8/2018 | Rutschman | G06T 7/20 |
| 2018/0247416 | A1* | 8/2018 | Ruda | G06Q 40/08 |
| 2018/0293864 | A1* | 10/2018 | Wedig | G08B 25/08 |
| 2019/0057314 | A1* | 2/2019 | Julian | H04L 67/34 |
| 2019/0122082 | A1* | 4/2019 | Cuban | G06T 7/73 |
| 2019/0268486 | A1* | 8/2019 | Tano | H04N 1/0044 |
| 2020/0342341 | A1* | 10/2020 | Dhalwani | G06V 20/35 |
| 2022/0065457 | A1* | 3/2022 | Bailey | H05B 3/746 |
| 2023/0052351 | A1* | 2/2023 | Dhalwani | G06F 18/2148 |

OTHER PUBLICATIONS

"U.S. Appl. No. 16/928,959, Final Office Action dated Jul. 27, 2022", 14 pgs.

"U.S. Appl. No. 16/928,959, Non Final Office Action dated Mar. 23, 2022", 19 pgs.

"U.S. Appl. No. 16/928,959, Notice of Allowance dated Oct. 4, 2022", 10 pgs.

"U.S. Appl. No. 16/928,959, Response filed May 5, 2022 to Non Final Office Action dated Mar. 23, 2022", 10 pgs.

"U.S. Appl. No. 16/928,959, Response filed Sep. 19, 2022 to Final Office Action dated Jul. 27, 2022", 10 pgs.

* cited by examiner

US 11,789,179 B2

GENERATING WEATHER DATA BASED ON MESSAGING SYSTEM ACTIVITY

CLAIM OF PRIORITY

This application is a continuation of U.S. patent application Ser. No. 16/928,959, filed Jul. 14, 2020, which is a continuation of U.S. patent application Ser. No. 15/989,967, filed on May 25, 2018, which are incorporated herein by reference in their entirety.

BACKGROUND

A content sharing platform may receive millions of messages from users desiring to share media content such as audio, images, and video between user devices (e.g., mobile devices, personal computers, etc.). The users may comprise a variety of different demographics (e.g., age, gender, location), may have various preferences for content, may have various levels of social activity, and so forth. Moreover, media content may be generated in a wide variety of geographic locations and venues, at particular times of the day and year, and the like.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to detecting and extracting weather data based on user system activity. Messaging and social applications and systems may provide various creative tools for communicating messages between users. For example, a messaging application may provide a creative tool to add an overlay to an image or video showing snow because it is winter or sunshine because it is summer. These creative tools, however, may not be accurate for all locations. For example, it does not snow in the winter in Los Angeles and it may be raining in the summer in Florida. Moreover, a user may be inside a location (e.g., in a building or other venue) that has a different temperature than it is outside for the season, making the creative tool even less relevant.

Some example embodiments provide for generating more accurate weather data based on user system activity in a messaging or other social communication system. For example, some embodiments provide for generating data associated with whether a media content item is generated inside (e.g., inside an enclosed location such as a building) or outside (e.g., outside any enclosed location) from messaging activity in a messaging system. In some embodiments, users of a messaging system directly provide information about whether or not the image or video they have captured is inside or outside, the temperature if an inside location, the venue type or name, and so forth. In another example, the weather and venue data may be generated by the computing device that is capturing the media content item to determine location (e.g., via GPS), sensors to detect temperature inside or outside, and so forth. In various example embodiments this data is used to train a machine learning model to predict whether or not a media content item is captured inside or outside. The data can be further used to determine an inside temperature for a particular venue or venue type.

Figure 1:
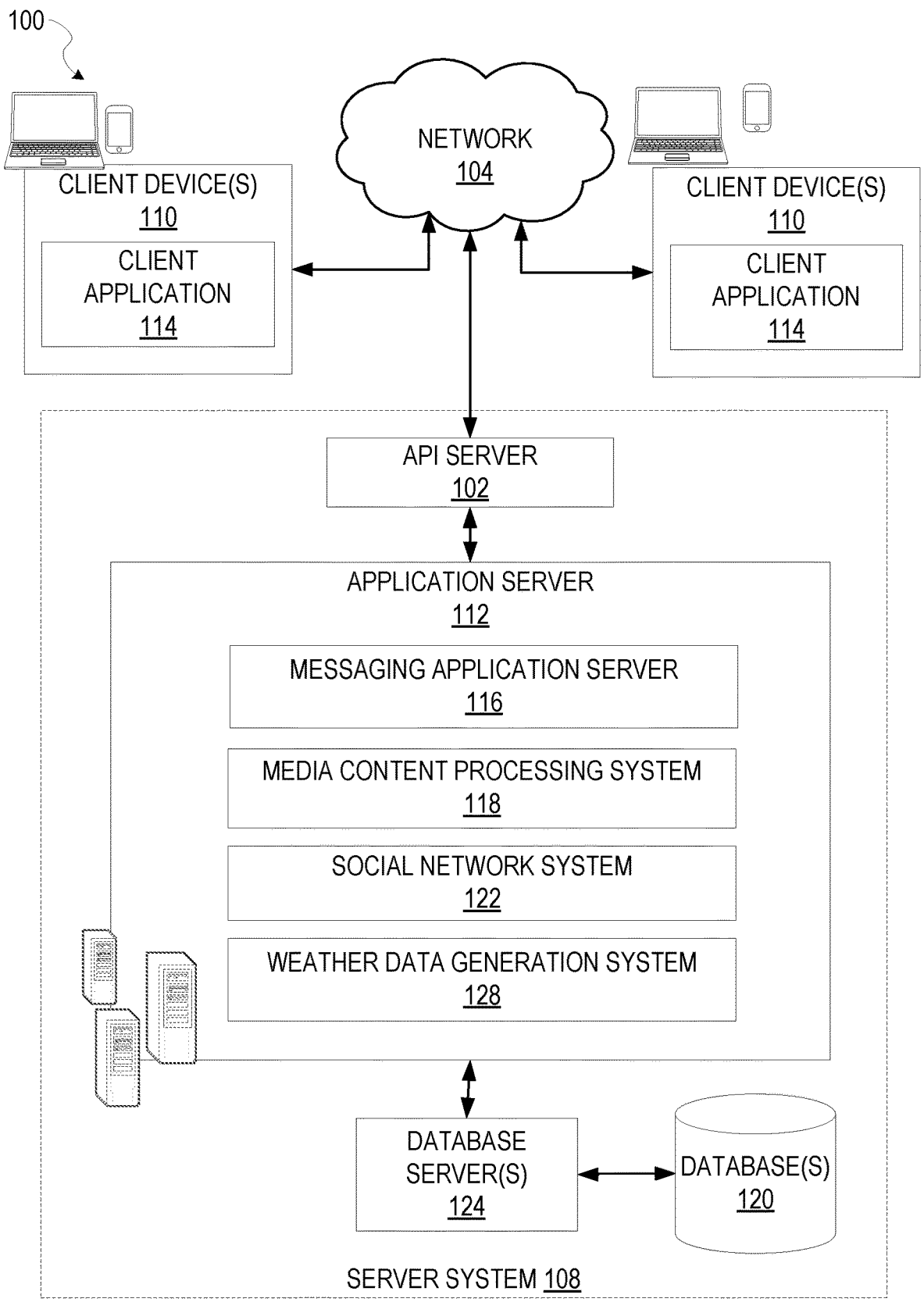
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and create and access a plurality of media collections.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third-party servers, server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, user behavior analysis application, and the like.

In some embodiments, one or more client applications 114 may be included in a given one of the client devices 110, and configured to locally provide the user interface and at least some functionalities, with the client application 114 configured to communicate with other entities in the system 100 (e.g., third-party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third-party servers, server system 108, etc.).

In one example, a client application 114 may be a messaging application (e.g., messaging client application 114 as referred to below) that allows a user to take a photograph or video, add a caption to or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, a social network system 122, and a weather data generation system 128, which may be communicatively coupled with each other and with one or more data storage(s), such as database(s) 120.

The server system 108 may be a cloud-computing environment, according to some example embodiments. The server system 108, and any servers associated with the server system 108, may be associated with a cloud-based application, in one example embodiment.

The one or more database(s) 120 may be storage devices that store information such as original media content from users (e.g., high-quality media content), processed media content (e.g., media content that is formatted for sharing with client devices 110 and viewing on client devices 110), context data related to a media content item, context data related to a user device (e.g., computing or client device 110), creative tools or functionality such as media overlays, user data, user device information, media content (e.g., video and images), media content data (e.g., data associated with video and images), computing device context data, serialized data, session data items, user activity data, and so forth. The one or more databases 120 may further store information related to third-party servers, third-party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third-party servers (not shown). The one or more third-party servers may include one or more third-party application(s). The one or more third-party application(s), executing on the third-party server(s), may interact with the server system 108 via the API server 102 via a programmatic interface provided by the API server 102. For example, one or more of the third-party applications may request and utilize information from the server system 108 via the API server 102 to support one or more features or functions on a web site hosted by a third party or an application hosted by the third party. The third-party server, website, or application, for example, may request and utilize information related to weather data generation from the server system 108 (e.g., via weather data generation system 128). The third-party website or application, for example, may provide functionality that is supported by relevant functionality and data in the server system 108. The third-party servers may also provide weather data to the server system 108.

Each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and user data (e.g., user click data), as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, the social network system 122, and the weather data generation system 128. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 204 (depicted in FIG. 2) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WI-FI, Long Term Evolution (LTE), or Bluetooth).

The weather data generation system 128 may be responsible for generation of weather data from user activity in a messaging system, as described in further detail below.

Figure 2:
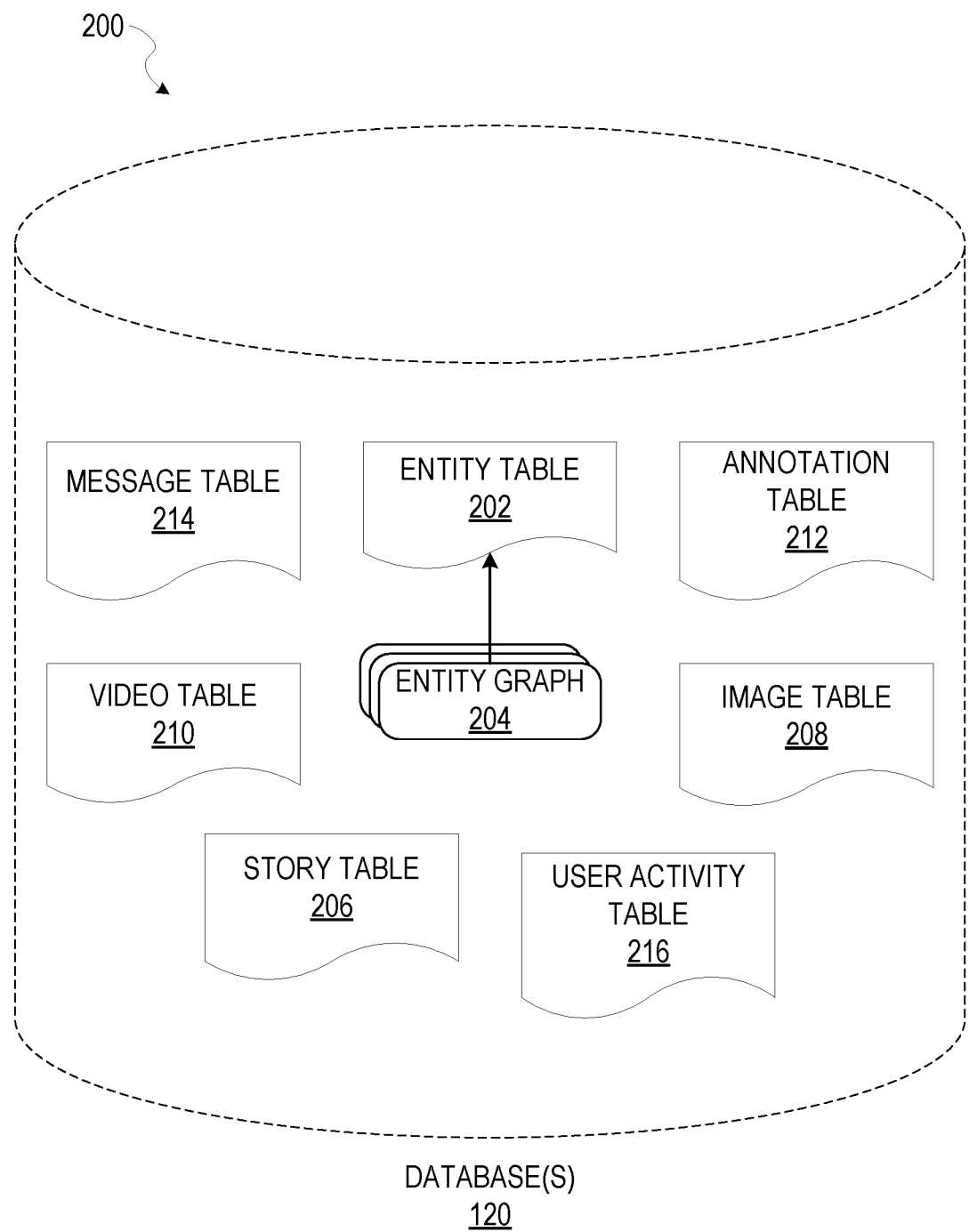
FIG. 2 is a schematic diagram illustrating data which may be stored in a database of a messaging server system, according to some example embodiments.

FIG. 2 is a schematic diagram 200 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 212. Annotation data may also be referred to herein as "creative tools" or "interactive features." Annotation data may comprise predefined interactive messages to be provided to users.

Media overlays or filters, for which data is stored within the annotation table 212, are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 212 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the message table 214. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 202). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

A user activity table 216 stores data related to user activity associated with usage of the messaging system. In one example, the user activity table 216 stores data associated with the days and times that each user is accessing an application 114 related to the messaging system to generate messages, send messages, view messages, search for and view media collections, and so forth.

Figure 3:
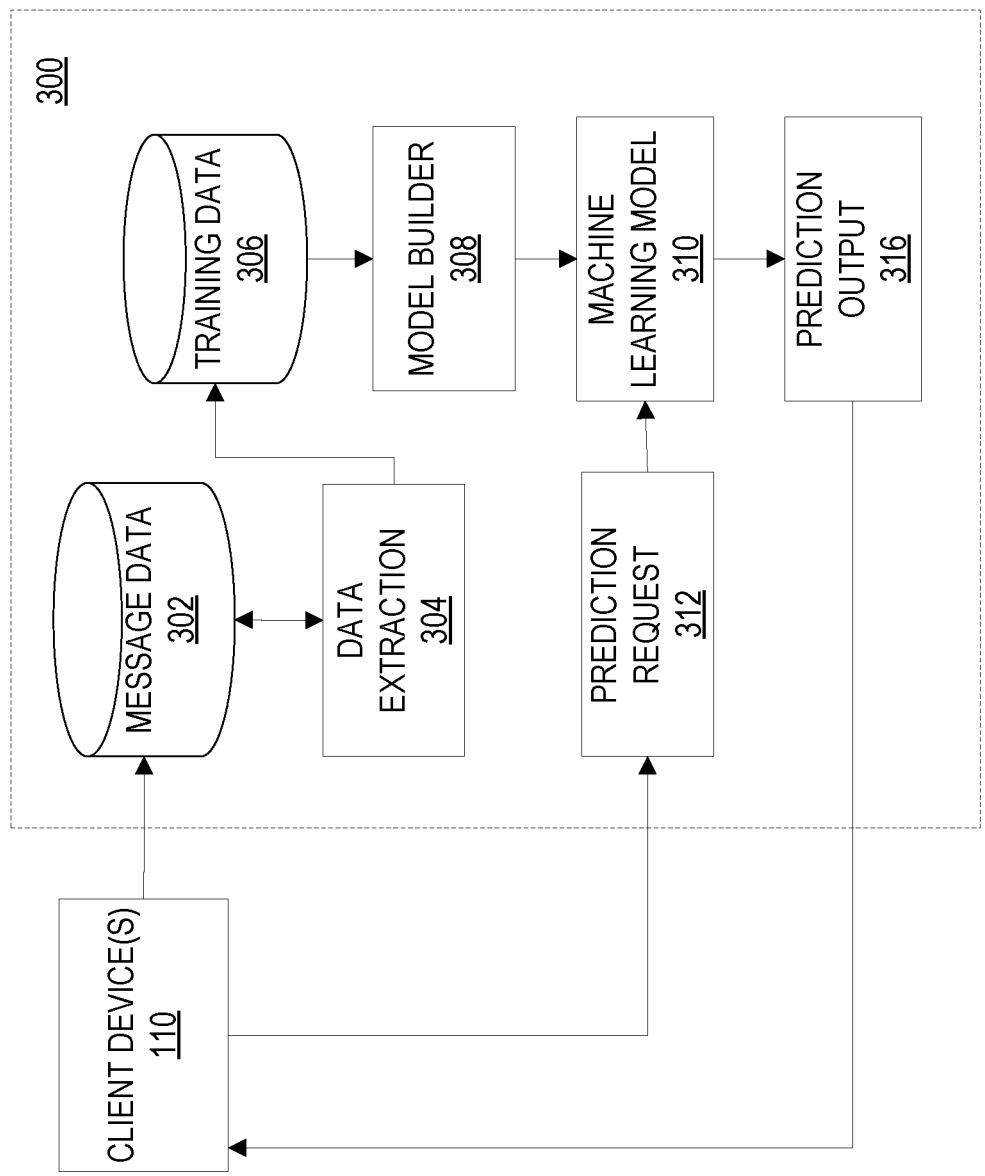
FIG. 3 is a block diagram illustrating a machine learning modeling system, according to some example embodiments.

FIG. 3 is a block diagram illustrating a machine learning modeling system 300 that may be part of the weather data generation system 128. Client devices 110 may generate a plurality of messages to be exchanged between one or more users. These messages may be received by the server system 108 (as explained above) and may be stored as message data in one or more databases 302 to be used to extract data for training the machine learning model 310.

In one example, users of a messaging or social network communication system may have the option to send additional information related to temperature or weather along with the messages that they are sending over the messaging network. For example, they may be asked to opt in to provide the additional information, such as whether a media content item (e.g., photograph or video) associated with the message was generated or taken inside or outside. If the media content item was generated inside, additional information that may be provided may include what type of business or venue the media content item was taken in, any indoor temperate information that is available, and so forth. For example, it may be in the middle of a freezing winter night in Wisconsin and the user may be taking a photo inside a nightclub where the temperature is 80 degrees Fahrenheit. After the user generates the image or video, he may be asked a few questions about the type of venue (e.g., nightclub, restaurant, coffee shop, etc.), the name of the venue, the temperature in the venue, and the like. In the alternative, the computing device may automatically determine the venue type and name based on the location of the computing device (e.g., using GPS data, mapping data, and the like), and a temperature based on one or more sensors in the computing devices. In another alternative, a combination of user questions and data determined from the computing device may be used.

In another example, the user may be a verified owner or manager of the venue who may be able to confirm that certain messages were sent from the venue and temperature data for the messages. For example, the verified owner or manager may be able to view messages that appeared to be sent from the venue (e.g., from users who have opted in to provide data about venue and temperature) to confirm that they were indeed from inside the venue and confirm the inside temperature of the venue when the message was generated.

This additional data related to temperature and venue may be sent by each client device 110 to the machine learning modeling system 300 and received by the machine learning modeling system 300, and stored as message data 302. For example, the message data 302 may comprise the message, one or more media content items associated with the message, and the venue (e.g., location, name, type, etc.) information associated with the message, whether the one or media content items were generated inside or outside, among other data.

A data extraction 304 extracts data from the message data 302 and stores the data as training data 306. For example, the data extractor 304 may extract media content items and associated data about whether each item was generated inside or outside to store as training data 306 (e.g., based on an indication in the message that the media content item was generated inside or outside). For example, the data extractor 304 may determine a predetermined amount of media content items with data indicating they were generated inside and determine a predetermined amount of media content items with data indicating they were generated outside, and store this as training data 306. The model builder 308 uses the training data 306 to train a machine learning model (e.g., based on computer vision or similar technology) to be able to predict whether or not a media content item (e.g., image or video) was generated inside or outside. The machine learning model will be tested for accuracy until a final machine learning model 310 is trained and ready to use for predictions.

A prediction request module 312 receives requests for a prediction (e.g., during generation or capture of a media content item or message, or after a media content item or message is generated by the client device 110) from the client device(s) 110 and inputs the requests into the machine learning model 310. The prediction request may comprise one or more media content items. The machine learning model 310 analyzes the media content item to generate a prediction, as described in further detail below. The prediction may comprise a score indicating whether or not the media content item was generated inside or outside. A prediction output module 316 may take the prediction output by the machine learning model 310 and return the score(s) to the client device(s) 110. In on example, the prediction output module 316 my simply return the score to the client device(s) 110; in another example, the score may be used to further generate creative content or functionality related to the prediction, as described below.

Any one or more of the modules described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the machine learning modeling system 300 may physically include an arrangement of one or more of the processors (e.g., a subset of or among the one or more processors of the machine) configured to perform the operations described herein for that module. As another example, any module of the machine learning modeling system 300 may include software, hardware, or both, that configure an arrangement of one or more processors (e.g., among the one or more processors of the machine) to perform the operations described herein for that module. Accordingly, different modules of the machine learning modeling system 300 may include and configure different arrangements of such processors or a single arrangement of such processors at different points in time. Moreover, any two or more modules of the media machine learning modeling system 300 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
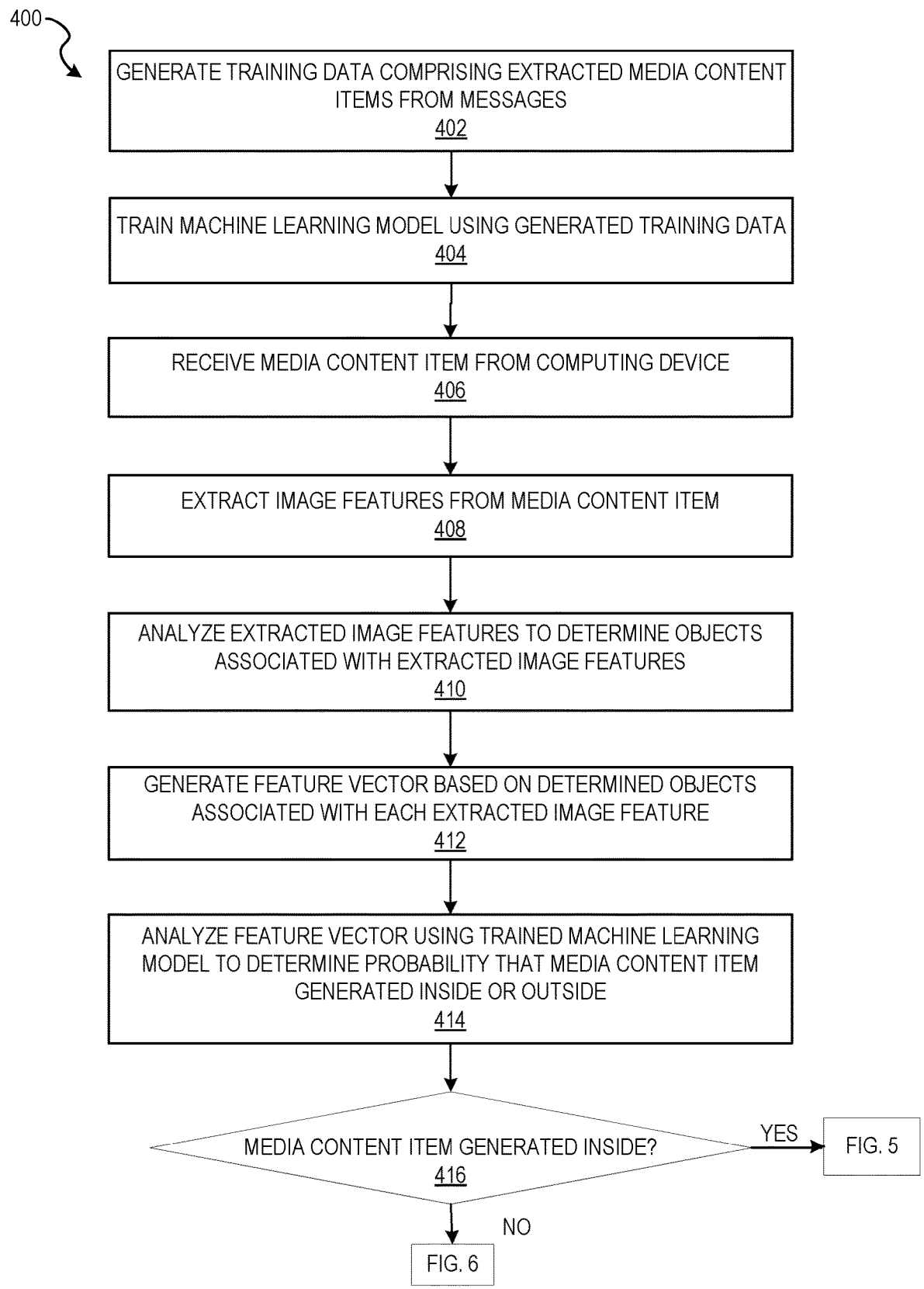
FIG. 4 is a flow chart illustrating aspects of a method, according to some example embodiments.

FIG. 4 is a flow chart illustrating aspects of a method 400, according to some example embodiments. For illustrative purposes, the method 400 is described with respect to the networked system 100 of FIG. 1 and machine learning modeling system 300 of FIG. 3. It is to be understood that the method 400 may be practiced with other system configurations in other embodiments.

In operation 402, a computing system (e.g., server system 108 or weather data generation system 128) generates training data comprising extracted media content items from messages that have been generated by a plurality of computing devices (e.g., client devices 110) associated with a plurality of users in a messaging system. For example, the computing system accesses one or more databases 302 comprising messaging data generated by the plurality of computing devices associated with the plurality of users in a messaging system and analyzes the messages or messaging data to extract media content items (e.g., images or video) and data indicating that the media content item was generated inside or outside. In operation 404, the computing system trains a machine learning model using the generated training data comprising the media content items to determine a probability that a media content item was generated inside an enclosed location or outside.

After the machine learning model is trained, the computing system uses the machine learning model to determine whether a media content item was generated inside or outside. In operation 406, the computing system receives a media content item from a computing device (e.g., client device 110). For example, a user may be using the computing device to capture a photograph of himself and a friend dancing in a nightclub. The computing device sends the photograph to the computing system and the computing system receives the photograph and extracts image features from the media content item, as shown in operation 408. Extracting features from the media content item may comprise detecting and isolating various desired portions or shapes (e.g., features) of the media content item (e.g., image or video) to parse the media content item into segments. Example embodiments may use computer vision techniques or other technology to detect and extract features from media content items.

In operation 410, the computing system analyzes the extracted image features of the media content item to determine objects associated with the extracted image features. For example, the computing system may use object detection or other computer vision technology to classify the extracted image features into one of many different categories (e.g., indicators of location such as sky vs. walls, etc.).

In operation 412, the computing system generates a feature vector based on the determined objects associated with each extracted image feature and inputs the feature vector into the trained machine learning model to analyze the feature vector using the trained machine learning model to determine a probability that the media content item was generated inside an enclosed location or outside, as shown in operation 414.

In operation 416, the computing system determines whether or not the media content item was generated inside or outside, based on the probability generated by the trained machine learning model. For example, the computing system may compare the prediction score (e.g., between 0 and 1) output from the trained machine learning model to a predetermined threshold (e.g., 0.5, 0.7, 0.9) to determine that the media content item was generated inside. For instance, the predetermined threshold may be 0.9 and thus, if a prediction score is 0.9 or above that the media content item was generated inside, the computing system would determine that the media content item was generated inside and proceed to operation 502 of FIG. 5. In another example, the computing system may determine that the media content item was generated outside, by similarly comparing the generated score to a predetermined threshold, and proceed to operation 602 of FIG. 6.

Figure 5:
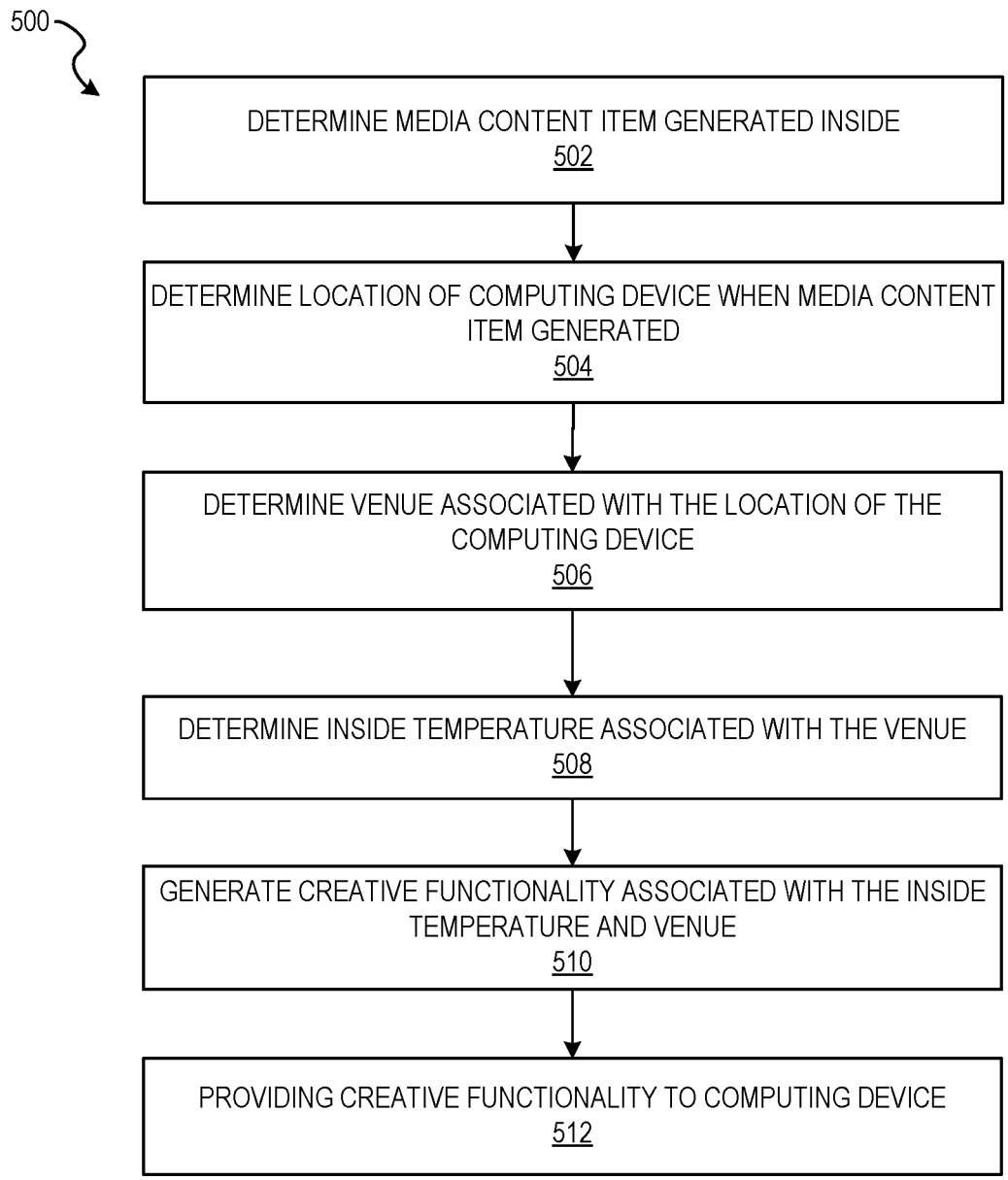
FIG. 5 is a flow chart illustrating aspects of a method, according to some example embodiments.

FIG. 5 is a flow chart illustrating aspects of a method 500 for determining a media content item was generated inside and related functionality, according to some example embodiments. For illustrative purposes, the method 500 is described with respect to the networked system 100 of FIG. 1 and machine learning modeling system 300 of FIG. 3. It is to be understood that the method 500 may be practiced with other system configurations in other embodiments.

In operation 502, the computing system determines that the media content item was generated inside, as explained above. In operation 504, the computing system determines the location of the computing device when the media content item was generated. For example, the computing system may use location data sent by the computing device with the media content item to determine the coordinates of the location for the computing device (e.g., via GPS or other technology). In operation 506, the computing device determines a venue associated with the location of the computing device. For example, the computing system may use a third-party mapping resource to determine a venue for the particular coordinates of the computing device (e.g., request venue data for particular coordinates and receive venue data from the third-party mapping resource), use mapping data generated from the plurality of messages in the messaging system, use data generated from the plurality of computing devices that provided data on venue and venue type, and the like.

In operation 508, the computing system determines an inside temperature associated with the venue. As explained above, the computing system may receive and store message data in one or more databases 302. This message data 302 may comprise data indicating a venue and venue type, a date, a time of day, a temperature inside the venue, and so forth. A particular venue may have various data associated with it from the plurality of computing devices, such as venue name, venue address, venue type, temperature data for various times of the day and year, and so forth. This data may also be sorted based on venue type to determine temperature data for a venue type for various times of the day and year, and so forth.

In one example, the computing system determines an inside temperature associated with the venue by determining whether there is any data that has been generated for that particular venue. For example, the venue may be "ACME nightclub" in San Francisco, and the computing system may access the venue data to determine whether there is any temperature data for ACME nightclub. If there is temperature data for ACME nightclub, the computing system uses the temperature data as the temperature to associate with the media content item. This may be an average of all of the temperature data for ACME nightclub, or an average of the temperature data for ACME nightclub based on the time of day and/or time of year when the media content item was generated. For example, the inside temperature of a location may vary based on the time of day or time of year and thus, it may be more accurate to take the time of day and year into consideration.

If there is no temperature data for the particular venue, the computing system may use temperature data associated with the same or similar venue type. For example, the computing system may use temperature data associated with "nightclubs" generally or with "nightclubs" in the same or similar location (e.g., San Francisco or the bay area). This may be an average of all of the temperature data for nightclubs, an average of temperature data for nightclubs in the same or similar location, an average of the temperature data for nightclubs based on the time of day and/or time or year, and so forth.

The computing system may use the determined inside temperature to generate creative functionality associated with the inside temperature and venue, as shown in operation 510. Creative functionality referred to herein may include media overlays to augment a media content item (e.g., stickers, templates, lenses, etc.), creative tools to edit or alter a media content item (or one or more portions of a media content item), other functionality that allows the user to augment or edit a media content item. Creative functionality may also include further information and detail about activities, venues, applications, products, or the like related to the temperature or weather. The creative functionality may be predetermined based on a weather condition or temperature range. For example, if the temperature is above a certain temperature one or more creative functionality related to hot weather may be available. For example, creative functionality may be available to overlay text or images indicating something about the weather (e.g., the temperature, one or more weather conditions, a comment on the temperature or the weather (e.g., "it's hot", or "triple digits today," etc.), etc.). The creative functionality may be created in advance and associated with one or more weather conditions, such as temperature, snow, wind, sun, and so forth. The creative functionality may also be generated partially real-time to include specific weather or location data such as the temperature in a certain location (e.g., "25 degrees in Minneapolis"), or one or more weather conditions in a certain location (e.g., "snowy day in NY," or animation showing snow falling in the media content item), suggest activities or venues based on the weather of location (e.g., "Cool off at Mr. D's ice cream down the street," or "outdoor ice skating now open at the embarcadero"), or the like.

For example, if the computing system determines the inside temperature is 75 degrees Fahrenheit it may generate creative functionality that allows the user to overlay text or images saying, "it's getting hot in here," or that shows sweat running down the face of a person in the media content item, or that shows the temperature of the location, or that suggests a place to cool off or a product or service for warmer weather, and so forth. This creative functionality may be determined or generated real-time (or near real-time) and provided (e.g., sent) to the computing device, as shown in operation 512, so that a user can use it immediately when generating the image or video and then send a message comprising the media content item and one or more creative functionality to one or more other users. Thus, the user can use the creative functionality to augment the media content item or generate a new media content item with creative functionality relevant to the inside temperature of the venue, regardless of the outside temperature. In another example, the creative functionality may be generated by the computing device based on the temperature data received by the computing system.

The computing system may determine whether or not a particular creative functionality was used and use this data as validation data to determine if the inside venue determined for the venue was correct. For example, the computing system may receive information from the computing device on what creative functionality was used or determine from the message comprising the media content item that was received from the computing device what creative functionality is included in the message. The computing system may store the indication as validation data associated with the venue and use the validation data to determine if the inside temperature for the venue was correct. For example, if the creative functionality was used by a plurality of users for that venue, the temperature information was likely correct. If the creative functionality was not used at all or only by a small number of people, this may indicate that the temperature information was not correct.

Figure 6:
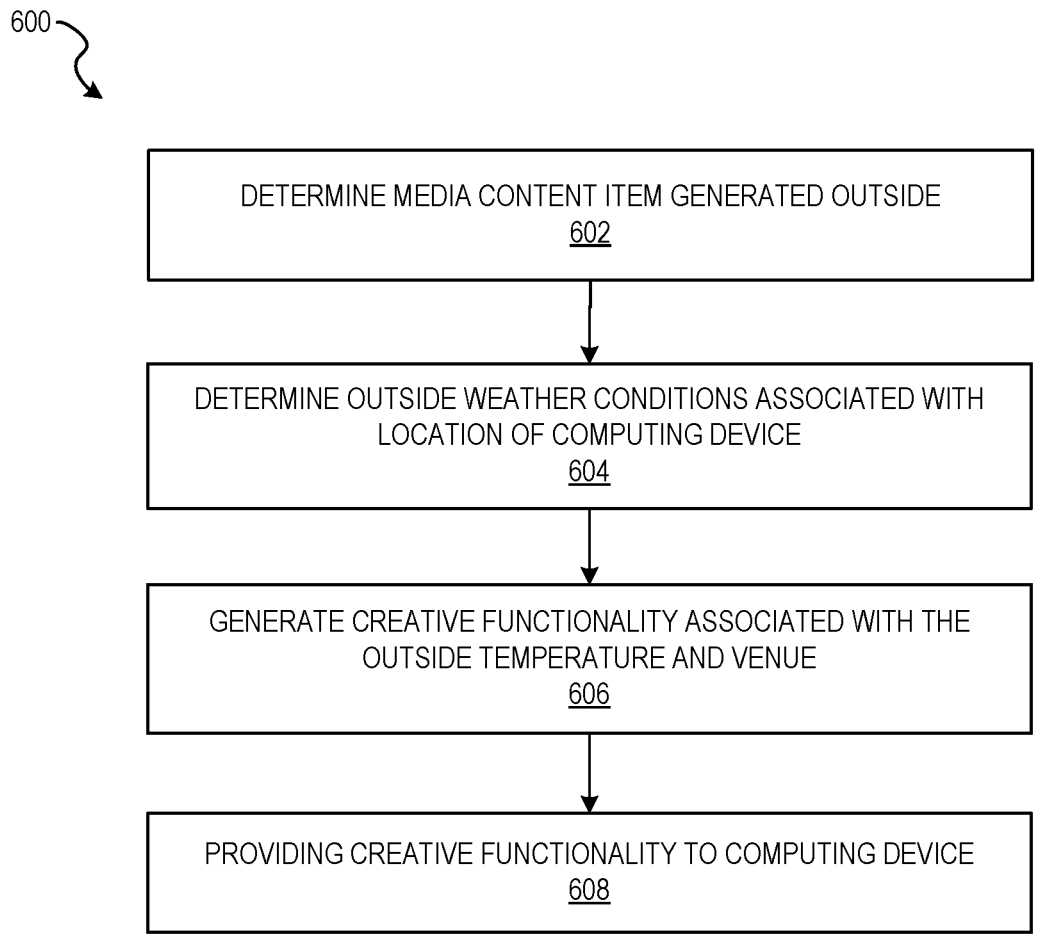
FIG. 6 is a flow chart illustrating aspects of a method, according to some example embodiments.

FIG. 6 is a flow chart illustrating aspects of a method 600 for determining whether a media content item was generated outside and related functionality, according to some example embodiments. For illustrative purposes, the method 600 is described with respect to the networked system 100 of FIG. 1 and machine learning modeling system 300 of FIG. 3. It is to be understood that the method 600 may be practiced with other system configurations in other embodiments.

In operation 602, the computing system determines that the media content item was generated outside, as explained above. The computing system may determine the location of the computing device when the media content item was generated, as also explained above, and in operation 604, the computing system determines outside weather conditions associated with the location of the computing device. The computing system may determine the outside weather conditions by sending a request to a weather source or resource to access weather data for the location (e.g., via an API for a weather service or resource). The computing system may receive the current weather data for the location (e.g., weather data for that day/time of the location) from the weather service or resource. The weather data may include temperature and other weather conditions, such as wind, rain, snow, sleet, hail, sun, clouds, and warnings (e.g., hurricane, blizzard, etc.), weather forecasts, and so forth.

In operation 606, the computing system generates creative functionality associated with the weather conditions of the location of the computing device. For example, the computing system may determine at least one weather condition associated with the location of the computing device (e.g., windy, cold, rainy, wet, dry, hot, etc.) and generate creative functionality based on one or more of the determined weather conditions.

In one example, if the weather is windy and cold, the computing system may generate creative functionality that allows a user to overlay text or images on the media content item saying, for example, "I'm getting blown away," or that shows hair of a person in the media content item blowing in the wind, or that shows the temperature and weather conditions of the location, and so forth. The creative functionality may be determined or generated real-time (or near real-time) and provided (e.g., sent) to the computing device, as shown in operation 608, so that a user can use it immediately when generating the image or video and then send a message comprising the media content item and one or more creative functionality to one or more other users. Thus, the user can use the creative functionality to augment the media content item or generate a new media content item with creative functionality relevant to the outside weather conditions of the location where the user is generating the media content item. In another example, the creative functionality may be generated by the computing device based on the weather condition data received by the computing system.

In other example embodiments, the computing system may generate creative functionality based on both inside temperature and outside weather conditions. For example, the computing system may determine that a media content item was generated inside, and then also determine the weather conditions outside of the venue, as explained above. The computing system may generate creative content for each of the inside temperature and the outside weather conditions, or creative functionality for a combination.

Figure 7:
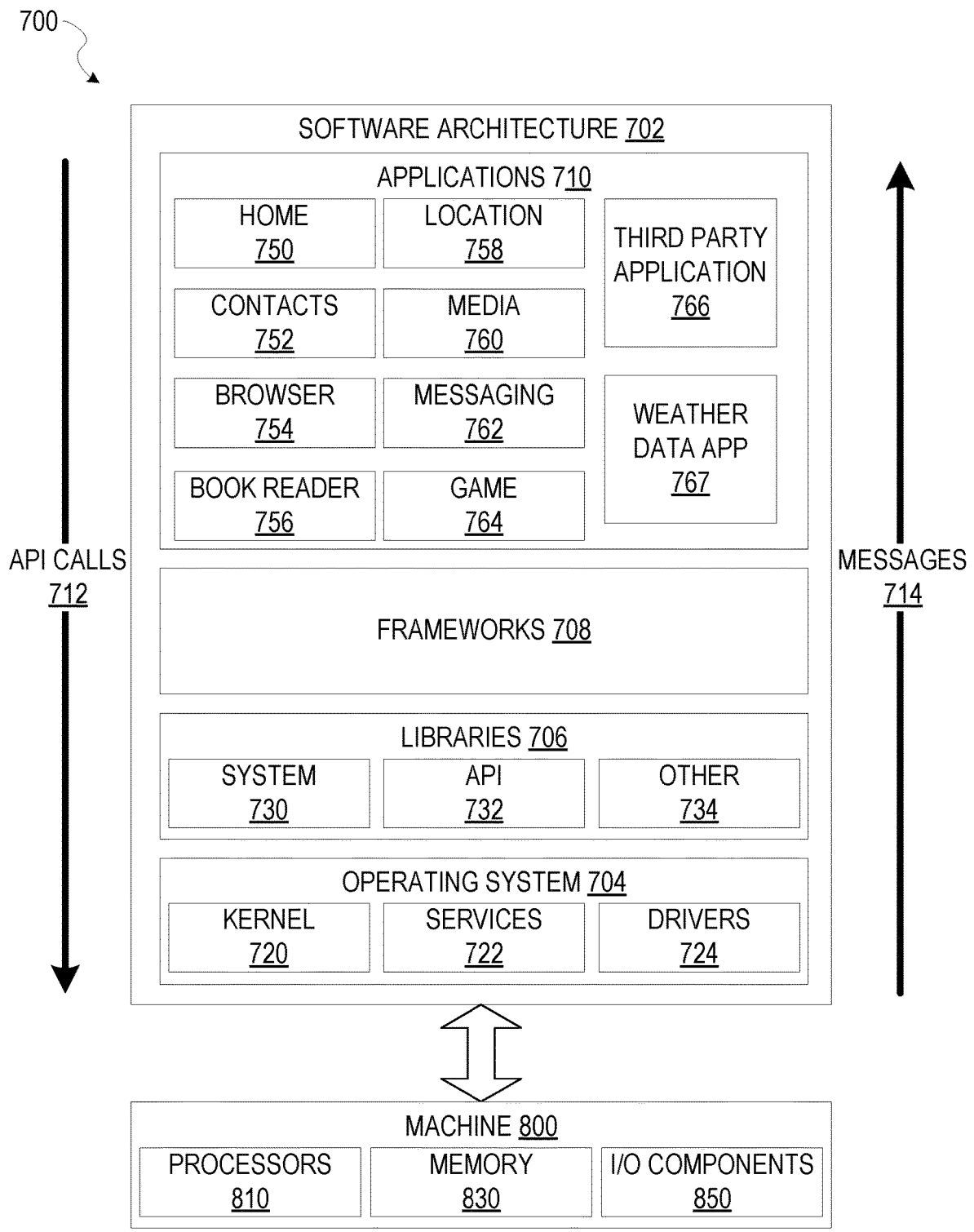
FIG. 7 is a block diagram illustrating an example of a software architecture that may be installed on a machine, according to some example embodiments.

FIG. 7 is a block diagram 700 illustrating a software architecture 702, which can be installed on any one or more of the devices described above. For example, in various embodiments, client devices 110, server systems 108, and servers 102, 112, 116, 118, 122, 124 and 128 may be implemented using some or all of the elements of the software architecture 702. FIG. 7 is merely a non-limiting example of a software architecture, and it will be appreciated that many other architectures can be implemented to facilitate the functionality described herein. In various embodiments, the software architecture 702 is implemented by hardware such as machine 800 of FIG. 8 that includes processors 810, memory 830, and input/output (I/O) components 850. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Some embodiments may particularly include a weather data application 767. In certain embodiments, this may be a standalone application that operates to manage communications with a server system such as third-party servers or the server system 108. In other embodiments, this functionality may be integrated with another application (e.g., messaging application 762). The weather data application 767 may request and display various data related to weather data, location data, messaging, media content, media collections, media overlays, and so forth, and may provide the capability for a user to input data related to the system via a touch interface, via a keyboard, or using a camera device of the machine 800, communication with a server system via I/O components 850, and receipt and storage of object data in memory 830. Presentation of information and user inputs associated with the information may be managed by the weather data application 767 using different frameworks 708, library 706 elements, or operating system 704 elements operating on the machine 800.

Figure 8:
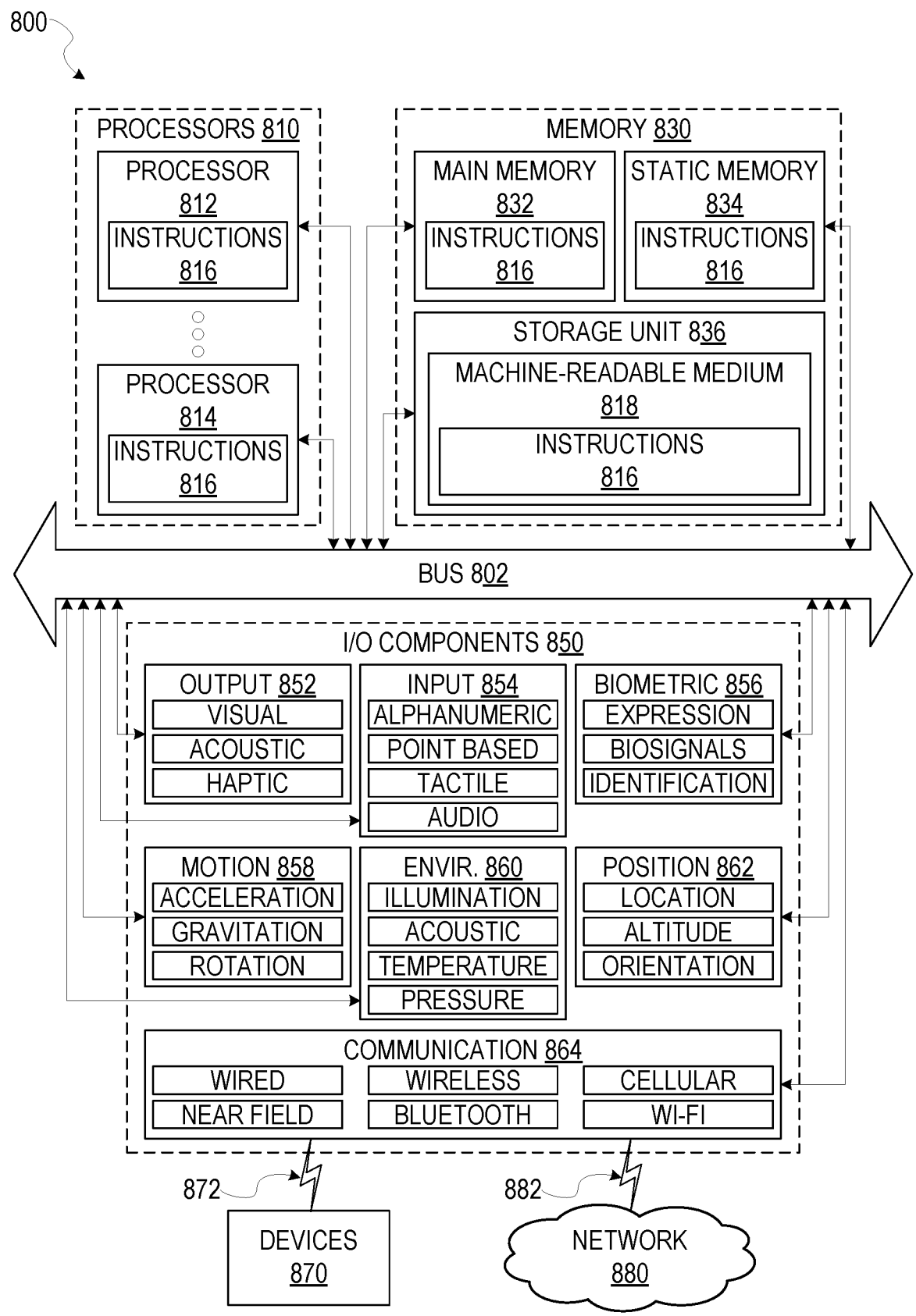
FIG. 8 illustrates a diagrammatic representation of a machine, in the form of a computer system, within which a set of instructions may be executed for causing the machine to perform any one or more of the methodologies discussed herein, according to an example embodiment.

FIG. 8 is a block diagram illustrating components of a machine 800, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine 108; application server 112, 116; media content processing system 118; social network system 122; database server 124; weather data generation system 128, and the like, or a client device 110 in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and I/O components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute instructions 816 contemporaneously. Although FIG. 8 shows multiple processors 810, the machine 800 may include a single processor 810 with a single core, a single processor 810 with multiple cores (e.g., a multi-core processor 810), multiple processors 812, 814 with a single core, multiple processors 812, 814 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 818 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 818.

As used herein, the term "memory" refers to a machine-readable medium 818 able to store data temporarily or permanently and may be taken to include, but not be limited to, random-access memory (RAM), read-only memory (ROM), buffer memory, flash memory, and cache memory. While the machine-readable medium 818 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 850 include biometric components 856, motion components 858, environmental components 860, or position components 862, among a wide array of other components. For example, the biometric components 856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 include acceleration sensor components (e.g., accelerometer), gravitation sensor components, rotation sensor components (e.g., gyroscope), and so forth. The environmental components 860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine 800 or any of a wide variety of peripheral devices (e.g., a peripheral device coupled via a Universal Serial Bus (USB)).

Moreover, in some embodiments, the communication components 864 detect identifiers or include components operable to detect identifiers. For example, the communication components 864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 816 are transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, in other example embodiments, the instructions 816 are transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Furthermore, the machine-readable medium 818 is non-transitory (in other words, not having any transitory signals) in that it does not embody a propagating signal. However, labeling the machine-readable medium 818 "non-transitory" should not be construed to mean that the medium is incapable of movement; the machine-readable medium 818 should be considered as being transportable from one physical location to another. Additionally, since the machine-readable medium 818 is tangible, the machine-readable medium 818 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a computing system, a media content item from a computing device;
   analyzing the media content item using a machine learning model to generate a probability that the media content item was generated inside an enclosed location;
   determining, based on the probability generated by the machine learning model, that the media content item was generated inside an enclosed location;
   determining an inside temperature associated with a venue associated with a location of the computing device when the media content item was generated, based on messages generated by a plurality of computing devices in a messaging system comprising media content items and temperature information for the venue or a similar venue type;
   generating creative functionality associated with the inside temperature; and
   providing the creative functionality to the computing device.

2. The method of claim 1, wherein the creative functionality is presented to a user of the computing device to use to augment the media content item or generate a new media content item.

3. The method of claim 1, wherein the media content item is a first media content item and the computing device is a first computing device, and the method further comprises:
   receiving a second media content item from a second computing device;

analyzing the second media content item using the machine learning model to generate a probability that the second media content item was generated inside an enclosed location;

determining, based on the probability generated by the machine learning model, that the second media content item was not generated inside an enclosed location;

determining at least one outside weather condition associated with a location of the second computing device;

generating creative functionality associated with the at least one outside weather condition and location of the second computing device; and providing the creative functionality to the second computing device.

4. The method of claim 1, further comprising:

requesting venue information and inside temperature information associated with a media content item from a plurality of computing devices generating messages; and storing the venue information in one or more databases;

wherein determining an inside temperature associated with the venue based on messages generated by a plurality of computing devices in a messaging system comprising media content items and temperature information for the venue or a similar venue type comprises accessing the one or more databases to determine a venue or similar venue type in the one or more databases and determining an average temperature for the venue or similar venue type.

5. The method of claim 1, wherein determining the inside temperature associated with the venue is further based on a time of day.

6. The method of claim 1, further comprising:

determining if the inside temperature determined for the venue was correct based on whether the creative functionality was utilized by the computing device or was not used by the computing device.

7. The method of claim 1, wherein the creative functionality is further generated based on the venue or similar venue type.

8. The method of claim 1, wherein the creative functionality comprises a media overlay to augment the media content item or a creative tool to edit or alter the media content item.

9. The method of claim 1, wherein the creative functionality comprises details about an activity, venue, application, or product related to the inside temperature.

10. A system comprising:

a memory that stores instructions; and one or more hardware processors configured by the instructions to perform operations comprising:

receiving a media content item from a computing device;

analyzing the media content item using a machine learning model to generate a probability that the media content item was generated inside an enclosed location;

determining, based on the probability generated by the machine learning model, that the media content item was generated inside an enclosed location;

determining an inside temperature associated with a venue associated with a location of the computing device when the media content item was generated, based on messages generated by a plurality of computing devices in a messaging system comprising media content items and temperature information for the venue or a similar venue type;

generating creative functionality associated with the inside temperature; and providing the creative functionality to the computing device.

11. The system of claim 10, wherein the creative functionality is presented to a user of the computing device to use to augment the media content item or generate a new media content item.

12. The system of claim 10, wherein the media content item is a first media content item and the computing device is a first computing device, and the operations further comprise:

receiving a second media content item from a second computing device;

analyzing the second media content item using the machine learning model to generate a probability that the second media content item was generated inside an enclosed location;

determining, based on the probability generated by the machine learning model, that the second media content item was not generated inside an enclosed location;

determining at least one outside weather condition associated with a location of the second computing device;

generating creative functionality associated with the at least one outside weather condition and location of the second computing device; and providing the creative functionality to the second computing device.

13. The system of claim 10, the operations further comprising:

requesting venue information and inside temperature information associated with a media content item from a plurality of computing devices generating messages; and storing the venue information in one or more databases;

wherein determining an inside temperature associated with the venue based on messages generated by a plurality of computing devices in a messaging system comprising media content items and temperature information for the venue or a similar venue type comprises accessing the one or more databases to determine a venue or similar venue type in the one or more databases and determining an average temperature for the venue or similar venue type.

14. The system of claim 10, wherein determining the inside temperature associated with the venue is further based on a time of day.

15. The system of claim 10, the operations further comprising:

determining if the inside temperature determined for the venue was correct based on whether the creative functionality was utilized by the computing device or was not used by the computing device.

16. The system of claim 10, wherein the creative functionality is further generated based on the venue or similar venue type.

17. The system of claim 10, wherein the creative functionality comprises a media overlay to augment the media content item or a creative tool to edit or alter the media content item.

18. The system of claim 10, wherein the creative functionality comprises details about an activity, venue, application, or product related to the inside temperature.

19. A non-transitory computer-readable medium comprising instructions stored thereon that are executable by at least one processor to cause a computing device to perform operations comprising:

a memory that stores instructions; and
one or more hardware processors configured by the instructions to perform operations comprising:
receiving a media content item from a computing device;
analyzing the media content item using a machine learning model to generate a probability that the media content item was generated inside an enclosed location;
determining, based on the probability generated by the machine learning model, that the media content item was generated inside an enclosed location;
determining an inside temperature associated with a venue associated with a location of the computing device when the media content item was generated, based on messages generated by a plurality of computing devices in a messaging system comprising media content items and temperature information for the venue or a similar venue type;
generating creative functionality associated with the inside temperature; and
providing the creative functionality to the computing device.

20. The non-transitory computer-readable medium of claim 19, wherein the creative functionality is presented to a user of the computing device to use to augment the media content item or generate a new media content item.

* * * * *